No. 686,156. Patented Nov. 5, 1901.
G. W. SNYDER.
SPRING SEAT POST.
(Application filed Oct. 30, 1900.)
(No Model.)
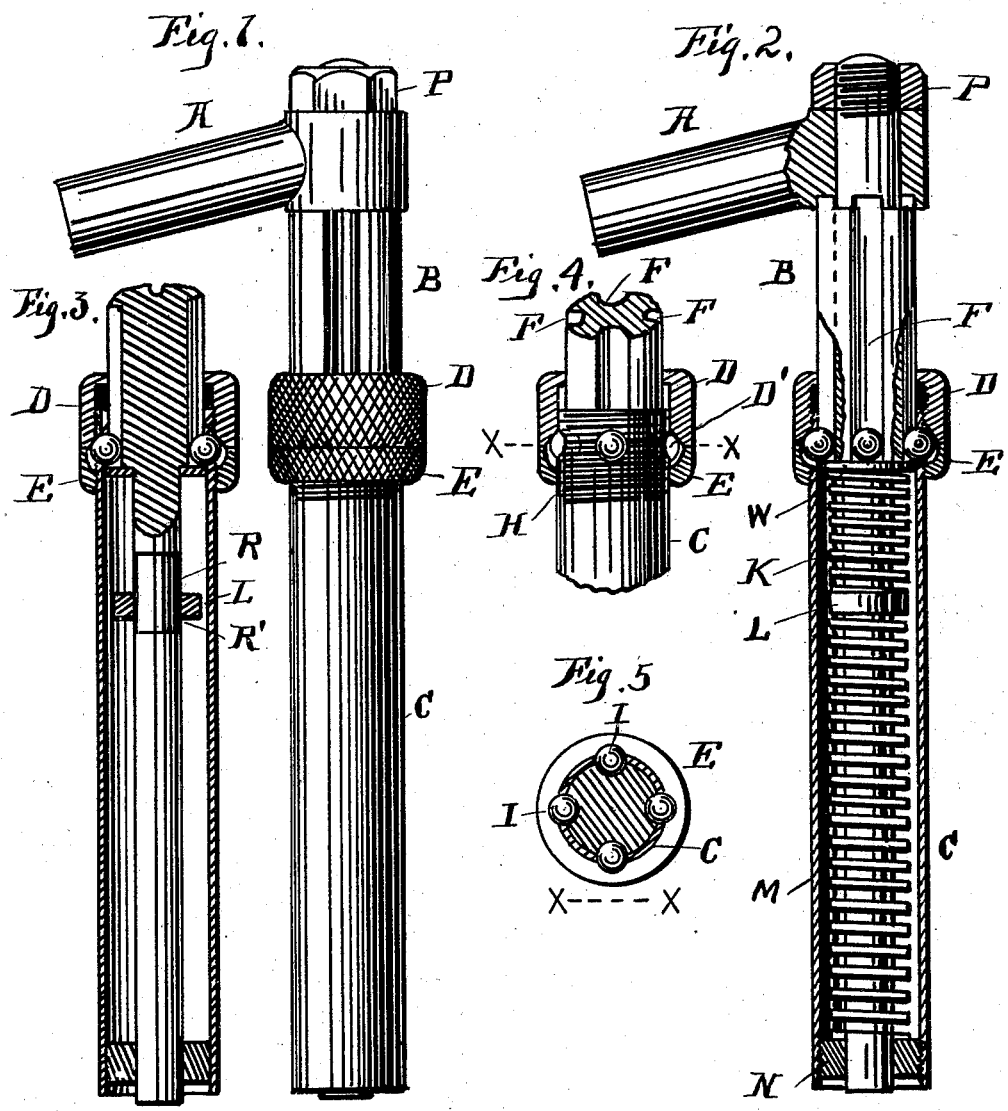
WITNESSES
Harry J. Perkins.
Elizabeth J. Phillips.
INVENTOR.
George W. Snyder
BY his ATTORNEY,
Edward Taggart

UNITED STATES PATENT OFFICE.

GEORGE W. SNYDER, OF GRAND RAPIDS, MICHIGAN, ASSIGNOR TO CHARLES H. BERKEY, OF GRAND RAPIDS, MICHIGAN.

SPRING SEAT-POST.

SPECIFICATION forming part of Letters Patent No. 686,156, dated November 5, 1901.

Application filed October 30, 1900. Serial No. 34,961. (No model.)

*To all whom it may concern:*

Be it known that I, GEORGE W. SNYDER, a citizen of the United States, residing at Grand Rapids, in the county of Kent and State of Michigan, have invented new and useful Improvements in Spring Seat-Posts, of which the following is a specification.

This invention relates to a new and novel spring seat-post for bicycles; and the invention consists in the combination and arrangement of parts hereinafter fully described and claimed.

The objects of my invention are, first, to so arrange a plurality of balls in a plurality of grooves in the seat-support, in combination with a nut peculiarly constructed, that the balls will at all times fit closely in the grooves and prevent any turning motion to the seat and seat-support; second, to furnish means for easily and readily taking up any wear in the seat-post; third, to so construct the post that the balls can be easily and cheaply inserted in position in the seat-post, and, fourth, to so arrange the springs and seat-support that the seat has a spring motion when it rebounds after a sudden depression of the main spring. These objects I accomplish by means of the mechanism illustrated in the accompanying drawings, in which—

Figure 1 is a side elevation of a seat-post constructed in accordance with my invention. Fig. 2 is also a side elevation, but partially in section. Fig. 3 shows a vertical sectional view of the tubular post and adjusting-nuts with the spring removed in order to show the construction of the support and washer. Fig. 4 shows the upper end of the tubular seat-post, the adjusting-nuts in section, and also a section of the seat-support, illustrating the part of the seat-support which is provided with grooves with which the balls engage. Fig. 5 shows a horizontal sectional view on line X X of Fig. 4.

Similar letters refer to similar parts throughout the several views.

A represents an arm attached to the seat-support and serving as a means for attaching the seat.

B is the seat-support proper, which fits into the tubular seat-post C. The seat-post C forms a part of the bicycle-frame and is constructed in the ordinary manner. It is provided at its upper end, however, with a screw-thread H and is also provided with a plurality of openings corresponding with the grooves in the seat-support. These openings are for the reception of the balls I.

D is the retaining and adjusting nut, being grooved out at D' into a conical form. The conical portion of the nut D bears upon the balls and retains them in place within the grooves F F, &c., of the seat-support.

E is a lock-nut mounted upon the seat-post, abutting against the nut D for locking the latter in position and provided with the groove E', registering with the groove D' of the nut D.

W is a washer surrounding the seat-support below the balls and forms an abutment for the upper end of the spring K.

L is a washer surrounding the seat-support and forming an abutment or stop for the lower end of the spring K. The seat-support B is provided with a broad groove, as shown in Fig. 3 by R. The lower portion of this groove forms a shoulder, against which the washer L rests when in normal position. This shoulder is shown by R'. L has a longitudinal movement along the seat-support B.

M is the main spring of the seat-support. The lower end of the spring M abuts against the adjusting-nut N. When the seat-support is pressed downward, both the springs K and M are compressed. If the strength of the spring M exceeds the strength of the spring K, the washer L will be raised from its seat. When the pressure is suddenly relieved, the seat-post will be raised quickly by the action of the spring M; but the spring K, having an abutting surface L at the lower end and W at the upper end, will be contracted and will prevent a sudden bumping or jarring of the seat—that is, the spring K forms a strong cushion for the seat-post in its upward movement.

In the drawings I have shown four grooves F, F, F, and F in the seat-support and four balls which fit into the four grooves. I do not wish, however, to limit myself to this particular number, as a greater or less number may be used without departing from the spirit of my invention. I have shown also in the drawings the spring K placed near the upper end of the seat-support. It will be evident that the same may be placed in any position in connection with the seat-support which will produce the result desired. It is also evident that the cushion-spring K may be used either with or without a ball-bearing seat-post.

In constructing my improved seat-post the openings in the tubular post C are of such size as to allow the balls to be placed through such openings into the grooves. The conical nut D is then turned down until it bears against the balls, pressing them into the grooves, as shown in Figs. 2 and 4. The lock-nut E is then turned so as to be brought in contact with the conical nut D, when it presents the appearance shown in Fig. 1. The arm A is held in position by means of the nut P in the ordinary manner.

Having thus described my invention, what I claim to have invented, and desire to secure by Letters Patent, is—

1. The combination with a seat-post provided with a screw-thread and a plurality of openings, of a seat-support having a plurality of grooves, a plurality of balls adapted to fit in said grooves and openings, and a conical nut engaging with the screw-thread of said post and bearing against said balls, retaining the same securely within said grooves and openings.

2. The combination of a seat-post provided at its upper end with an external screw-thread and a series of openings, a seat-support extending into the said post and provided with a series of grooves registering with the openings in the seat-post, a series of balls mounted in the said openings and grooves, a nut provided with a groove for retaining said balls in position, and a lock-nut provided with a groove registering with the groove of the first-mentioned nut and adapted to permit the play of the balls and to retain the said first-mentioned nut in position.

3. The combination of a seat-post provided at its upper end with a screw-thread and a series of openings, a seat-support extending into said post and having a portion of its length grooved and further provided with a shoulder, a washer mounted upon said support at the end of the grooved portion thereof, a washer mounted upon the said seat-support and supported by the said shoulder, a spring interposed between the said washers, a series of balls mounted in the said openings and engaging in the grooved portion of the said seat-support, and nuts mounted upon the said post for retaining the said balls in position.

4. The combination of a seat-post provided with openings, a grooved seat-support, a locking means engaging said support and extending through said openings, and means mounted on the periphery of said seat-post and contacting with said locking means outside the post for retaining the locking means in position.

5. A seat-post, a seat-support operating therein, ball-bearings extending through said seat-post and engaging said support, means engaging the periphery of said seat-post for retaining said balls in position, and an upper and lower spring mounted on said support, said lower spring being adjustable.

In testimony whereof I have hereunto set my hand in presence of two subscribing witnesses.

GEORGE W. SNYDER.

Witnesses:
EDWARD TAGGART,
ELIZABETH J. PHILLIPS.